United States Patent
Raveendran et al.

(10) Patent No.: US 9,001,804 B2
(45) Date of Patent: Apr. 7, 2015

(54) SHARING MULTI DESCRIPTION CODED CONTENT UTILIZING PROXIMATE HELPERS

(75) Inventors: Vijayalakshmi R. Raveendran, San Diego, CA (US); Samir S. Soliman, San Diego, CA (US); PhaniKumar K. Bhamidipati, San Diego, CA (US); Soham V. Sheth, San Diego, CA (US); Xun Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 802 days.

(21) Appl. No.: 13/162,153

(22) Filed: Jun. 16, 2011

(65) Prior Publication Data

US 2012/0321001 A1 Dec. 20, 2012

(51) Int. Cl.
*H04L 29/04* (2006.01)
*H04L 29/06* (2006.01)
*H04L 29/08* (2006.01)

(52) U.S. Cl.
CPC ............ *H04L 65/602* (2013.01); *H04L 65/604* (2013.01); *H04L 65/608* (2013.01); *H04L 65/80* (2013.01); *H04L 67/104* (2013.01)

(58) Field of Classification Search
None
See application file for complete search history.

(56) References Cited

U.S. PATENT DOCUMENTS

| | | | |
|---|---|---|---|
| 6,353,637 B1 * | 3/2002 | Mansour et al. | 375/260 |
| 7,426,677 B2 * | 9/2008 | Chou et al. | 714/776 |
| 7,788,378 B2 * | 8/2010 | Rao et al. | 709/226 |
| 7,813,427 B2 | 10/2010 | Orchard et al. | |
| 2002/0143918 A1 * | 10/2002 | Soles et al. | 709/223 |
| 2003/0009578 A1 | 1/2003 | Apostolopoulos et al. | |
| 2005/0165916 A1 * | 7/2005 | Cromer et al. | 709/220 |
| 2005/0232152 A1 * | 10/2005 | Mane | 370/231 |
| 2006/0190615 A1 | 8/2006 | Panwar et al. | |
| 2008/0130496 A1 | 6/2008 | Kuo et al. | |
| 2009/0147876 A1 * | 6/2009 | Ouyang | 375/267 |
| 2009/0262715 A1 * | 10/2009 | Juang | 370/338 |
| 2010/0033622 A1 * | 2/2010 | Bellers et al. | 348/448 |
| 2010/0049867 A1 * | 2/2010 | Panwar et al. | 709/231 |
| 2011/0206158 A1 * | 8/2011 | Kim et al. | 375/295 |

FOREIGN PATENT DOCUMENTS

| | | |
|---|---|---|
| EP | 0915598 A2 | 5/1999 |
| EP | 2139238 A1 | 12/2009 |
| WO | 2008023328 A2 | 2/2008 |

OTHER PUBLICATIONS

Ghareeb, M.; Ksentini, A; Viho, C., "Scalable Video Coding (SVC) for multipath video streaming over Video Distribution Networks (VDN)," Information Networking (ICOIN), 2011 International Conference on , vol., no., pp. 206,211, Jan. 26-28, 2011.*
Akyol, et al., "A flexible multiple description coding framework for adpative peer-to-peer video streaming" IEEE Journal of Selected Topics in Signal Processing, vol. 1, No. 2, Aug. 2007, pp. 231-245.
International Search Report and Written Opinion—PCT/US2012/042320—ISA/EPO—Feb. 4, 2013.

* cited by examiner

*Primary Examiner* — Ayaz Sheikh
*Assistant Examiner* — Tarell Hampton
(74) *Attorney, Agent, or Firm* — Donald C. Kordich

(57) ABSTRACT

An apparatus, system, and method utilizing multi-description coding (MDC) and one or more cooperative helper nodes to send streaming content on an uplink to a client over multiple paths. The client receives the multiple descriptions and aggregates them together to ideally obtain the original content at its original quality; however, if one or more of the descriptions is lost in the transmission, then the entire content can be generated from the remaining one or more descriptions that did arrive successfully.

64 Claims, 9 Drawing Sheets

SHARING MULTI DESCRIPTION CODED CONTENT UTILIZING PROXIMATE HELPERS

BACKGROUND

1. Field

The instant disclosure relates generally to wireless communications, and more particularly, to streaming media content on a wireless network.

2. Background

Wireless communication systems are widely deployed to provide various telecommunication services such as telephony, video, data, messaging, and broadcasts. In modern wireless access terminals, increased functionality including highly capable processors, large memory capacities, and increasing numbers of sources of multimedia input (e.g., video cameras, WLAN transceivers, and the like) creates the possibility to generate large amounts of content, which the user of the access terminal may wish to share utilizing the wireless network. However, in a wireless network, an upload of a stream from an access terminal to one or more access terminals or to a server in the cloud is typically constrained by the limited bandwidth of the reverse link (i.e., the uplink at the uploading access terminal).

Thus, improvements in the capability to stream large files and media content from a mobile device onto a network are highly desirable.

SUMMARY

An apparatus, system, and method utilizing multi-description coding (MDC) and one or more cooperative helper nodes to send streaming content on an uplink to a client over multiple paths. Utilizing multiple descriptions of content and sending the respective descriptions to proximate helper nodes, e.g., utilizing an out-of-band link such as Wi-Fi, provides both improved robustness and improved bandwidth. That is, even if one of the uplinks fails, the entire content can be recovered from any one of the multiple descriptions, as a virtue of the encoding utilized in MDC. Further, the simultaneous streaming of the descriptions over the multiple paths provides a bandwidth multiplier enabling quicker streaming of large media files to a remote client. The client receives the multiple descriptions and aggregates them together to ideally obtain the original content at its original quality; however, if one or more of the descriptions is lost in the transmission, then the entire content can be generated from the remaining one or more descriptions that did arrive successfully, albeit potentially at a different quality.

In an aspect of the disclosure, a method of sending content includes generating a plurality of descriptions related to the content that are different from one another but related to one another. The method further includes transmitting a first one of the plurality of descriptions utilizing an uplink, and sharing a second one of the plurality of descriptions with a first helper node capable of transmitting the second one of the plurality of descriptions on a second uplink.

In another aspect of the disclosure, an apparatus for wireless communication includes a processor and a memory coupled to the processor. Further, the apparatus includes an encoder coupled to the processor, for encoding content to generate a plurality of descriptions related to the content that are different from one another but related to one another, a first transmitter coupled to the processor, for transmitting a first one of the plurality of descriptions utilizing an uplink, and a second transmitter coupled to the processor, for transmitting a second one of the plurality of descriptions to a first helper node capable of transmitting the second one of the plurality of descriptions on a second uplink.

In another aspect of the disclosure, a method of wireless communication includes receiving a request from a content server to help the server send content to a client node, receiving, over a first interface, one of a plurality of descriptions of the content from the content server, and transmitting, over a second interface, the one of the plurality of descriptions of the content to the client node.

In another aspect of the disclosure, a method of wireless communication includes receiving a first description of content from a content server, receiving a second description of the content from a helper node proximate to the content server, and selectively combining at least a portion of the first description with at least a portion of the second description to obtain the content having a higher quality, as a whole, than either the first description or the second description taken alone.

In another aspect of the disclosure, a computer program product includes a computer-readable medium having code for generating a plurality of descriptions related to the content that are different from one another but related to one another, code for transmitting a first one of the plurality of descriptions utilizing an uplink, and code for sharing a second one of the plurality of descriptions with a first helper node capable of transmitting the second one of the plurality of descriptions on a second uplink.

In another aspect of the disclosure, a computer program product includes a computer-readable medium having code for receiving a request from a content server to help the server send content to a client node, code for receiving, over a first interface, one of a plurality of descriptions of the content from the content server, and code for transmitting, over a second interface, the one of the plurality of descriptions of the content to the client node.

In another aspect of the disclosure, a computer program product includes a computer-readable medium having code for receiving a first description of content from a content server, code for receiving a second description of the content from a helper node proximate to the content server, and code for selectively combining at least a portion of the first description with at least a portion of the second description to obtain the content having a higher quality, as a whole, than either the first description or the second description taken alone.

In another aspect of the disclosure, an apparatus for wireless communication includes means for generating a plurality of descriptions related to the content that are different from one another but related to one another, means for transmitting a first one of the plurality of descriptions utilizing an uplink, and means for sharing a second one of the plurality of descriptions with a first helper node capable of transmitting the second one of the plurality of descriptions on a second uplink.

In another aspect of the disclosure, an apparatus for wireless communication includes means for receiving a request from a content server to help the server send content to a client node, means for receiving, over a first interface, one of a plurality of descriptions of the content from the content server, and means for transmitting, over a second interface, the one of the plurality of descriptions of the content to the client node.

In another aspect of the disclosure, an apparatus for wireless communication includes means for receiving a first description of content from a content server, means for receiving a second description of the content from a helper node proximate to the content server, and means for selectively combining at least a portion of the first description with at least a portion of the second description to obtain the content having a higher quality, as a whole, than either the first description or the second description taken alone.

In another aspect of the disclosure, an apparatus for wireless communication includes a processor and a memory coupled to the processor. Here, the processor is configured to receive a request from a content server to help the server send content to a client node, to receive, over a first interface, one of a plurality of descriptions of the content from the content server, and to transmit over a second interface, the one of the plurality of descriptions of the content to the client node.

In another aspect of the disclosure, an apparatus for wireless communication includes a processor and a memory coupled to the processor. Here, the processor is configured to receive a first description of content from a content server, to receive a second description of the content from a helper node proximate to the content server, and to selectively combine at least a portion of the first description with at least a portion of the second description to obtain the content having a higher quality, as a whole, than either the first description or the second description taken alone.

DETAILED DESCRIPTION

Figure 1:
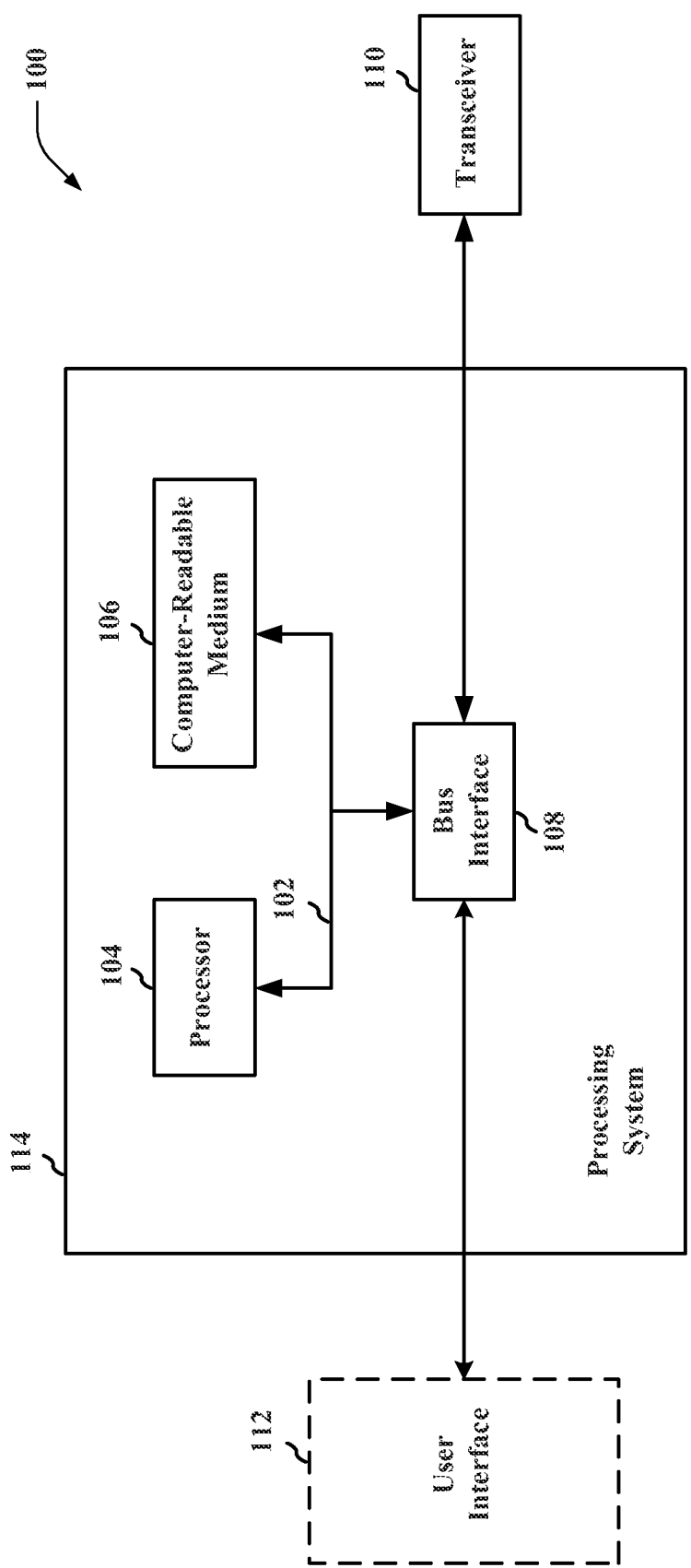
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Multi-Description Coding (MDC) is a coding technique for fragmenting content, such as a media stream, into multiple substreams, referred to as descriptions. Upon generation, each of the descriptions can be routed to a client device, which may aggregate the descriptions to recover the content. In MDC, the descriptions are different from one another, but related to one another. That is, the encoding of the descriptions is generally such that any individual one of the descriptions can be decoded to recover the entire content, although a degradation in the quality may be realized if one or more of the descriptions fails to reach the client. Thus, even if one of the streams fails to arrive at its destination, the receiver should still be able to recover the entire content, although some or all of the content may be at a relatively low quality.

MDC can be utilized to increase redundancy, e.g., for sending large files, typically utilizing a protocol such as FTP over a single link, or on a plurality of wireless channels from a single device. Utilization of MDC in this fashion reduces the amount of bandwidth required to send the content, since not all of the streams are necessary to be received to recover the content. Further, MDC provides improved robustness, since even if one of the streams is lost, the receiver may still recover the entire content, although some portions of it may be at a reduced quality.

In accordance with an aspect of the disclosure, a UE may dynamically encode the same content into multiple descriptions as the content is streamed to a client. Further, the UE may discover and manage one or more helpers to help the UE establish multiple links or paths from the UE to the client.

Here, the client may receive one or more of the streams. When the client receives a plurality of the streams, it may aggregate the streams together to recover the content, ideally at the original quality prior to fragmentation and MDC encoding.

Figure 2:
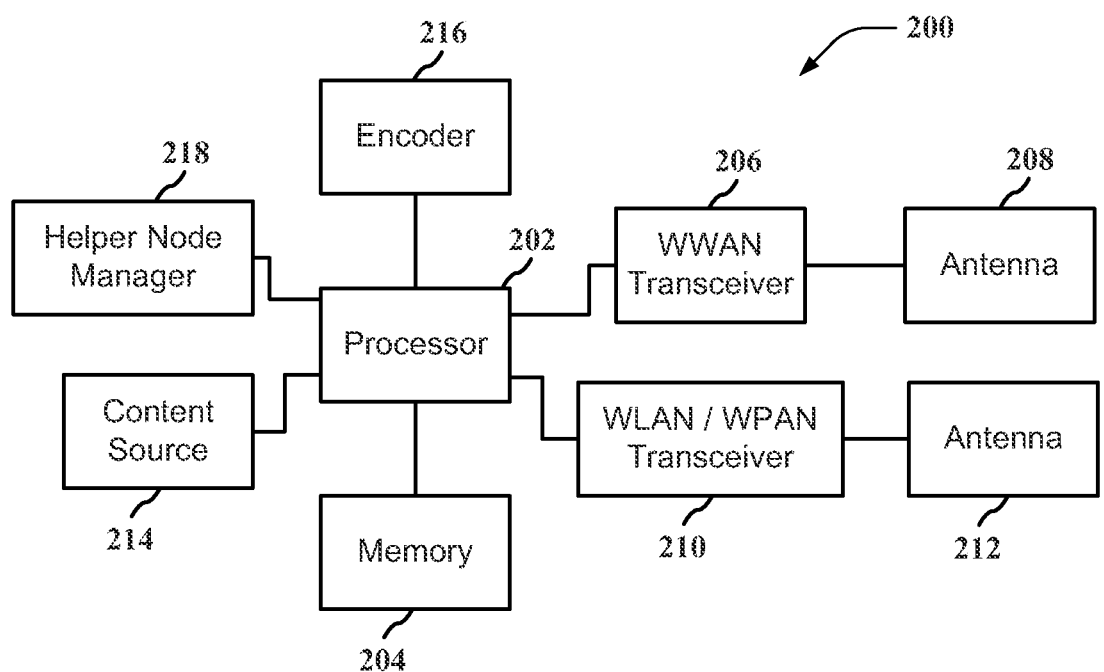
FIG. 2 is a simplified block diagram illustrating a mobile server apparatus (or a helper node) in accordance with some aspects of the disclosure.

FIG. 2 is a simplified block diagram illustrating a mobile server apparatus 200 in accordance with some aspects of the disclosure. The mobile server includes a processor 202. Here, the processor 202 may be the processor 104 illustrated in FIG. 1, or any other suitable processor or processing system. The processor 202 is coupled to a memory 204. The memory may be any suitable storage space capable of providing to the processor 202 a non-random aggregation of data, irrespective of its mode of storage or presentation.

The mobile server 200 further includes a wireless wide area network (WWAN) transceiver 206 for transmitting and receiving data over a suitable WWAN air interface utilizing an antenna 208. The WWAN air interface may follow any suitable protocol for wireless communication, such as but not limited to CDMA, TDMA, GSM, UMTS, cdma2000, LTE, WiMAX, etc.

The mobile server 200 further includes a wireless local area network (WLAN) or wireless personal area network (WPAN) transceiver 210, for transmitting and receiving data over a suitable WLAN or WPAN air interface utilizing an antenna 212. The WLAN/WPAN air interface may follow any suitable protocol for wireless communication, such as but not limited to IEEE 802.11, 802.15, Bluetooth™, Zigbee, etc. Here, communication utilizing the WLAN/WPAN air interface may be referred to as an out-of-band link, describing that the link may utilize a different band than that or those utilized by the WWAN transceiver 206.

The mobile server 200 further includes a content source 214. In some aspects, the content source 214 may be the same as the memory 204; that is, content may be stored in memory 204. In other aspects, the content source 214 may be one of the transceivers 206 or 210; that is, content may be received utilizing a respective air interface. In still other aspects, the content source 214 may be a still or video camera, a microphone, a sensor, or any other source of content that a user of the mobile server 200 may wish to share.

The mobile server 200 further includes an encoder 216 coupled to the processor 202. The encoder 216 is configured to perform the multi-description coding (MDC) of the content, e.g., to generate a plurality of descriptions of the content from the content source 214.

Further, the mobile server 200 includes a helper node manager 218 coupled to the processor 202 for discovering and managing one or more cooperative helper nodes. Here, the helper node manager 218 may utilize the WLAN/WPAN transceiver 210 to communicate with one or more helper nodes in a suitably located proximity to the mobile server 200 to coordinate the cooperative transmission of the multiple descriptions over respective uplinks to a network node.

In some aspects of the disclosure, a helper node may include many of the same components as those illustrated for the mobile server 200 illustrated in FIG. 2. That is, in some aspects of the disclosure each of the mobile server 200 and the helper node may be a conventional user equipment (UE) such as a mobile cellular telephone, wherein an MDC application may be software installed onto the device, such that the respective device may be configured to act as a mobile server 200 or a helper node, as necessary. Further, in some aspects of the disclosure, a helper node may be a source helper node, in which the helper node receives a description from a proximate content server, and provides the description on an uplink channel. In other aspects of the disclosure, the helper node may be a receiver helper node, in which the helper node receives a description over a WWAN air interface from a wide-area network, and provides the description to the client node utilizing the WLAN/WPAN air interface. That is, in various implementations, the helper node may be proximate to the content source or the client node.

Figure 3:
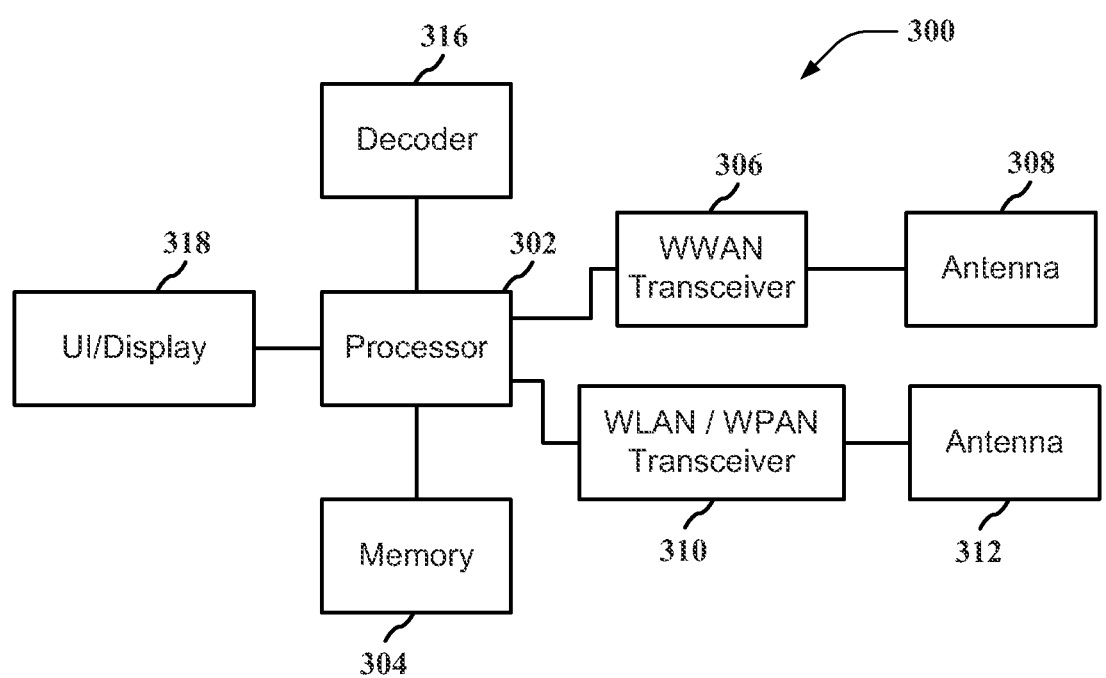
FIG. 3 is a simplified block diagram illustrating a client node in accordance with some aspects of the disclosure.

FIG. 3 is a simplified block diagram illustrating a client node 300 in accordance with some aspects of the disclosure. The client node 300 includes a processor 302. Here, the processor 302 may be the processor 104 illustrated in FIG. 1, or any other suitable processor or processing system. The processor 302 is coupled to a memory 304. The memory may be any suitable storage space capable of providing to the processor 302 a non-random aggregation of data, irrespective of its mode of storage or presentation.

The client node 300 further includes a WWAN transceiver 306 for transmitting and receiving data over a suitable WWAN air interface utilizing an antenna 308. The WWAN air interface may follow any suitable protocol for wireless communication, such as but not limited to CDMA, TDMA, GSM, UMTS, cdma2000, LTE, WiMAX, etc.

The client node 300 may further include a wireless local area network (WLAN) or wireless personal area network (WPAN) transceiver 310, for transmitting and receiving data over a suitable WLAN or WPAN air interface utilizing an antenna 312. The WLAN/WPAN air interface may follow any suitable protocol for wireless communication.

The client node 300 further includes a decoder 316 coupled to the processor 302. The decoder 316 is configured to decode the MDC-encoded content received from the mobile server 200 utilizing the WWAN transceiver 306, e.g., to aggregate the received description(s) to generate a version of the content. The client node 300 may further include a user interface 318 such as a display device, speaker, etc., so that the decoded content may be enjoyed by the user of the client node 300.

Figure 4:
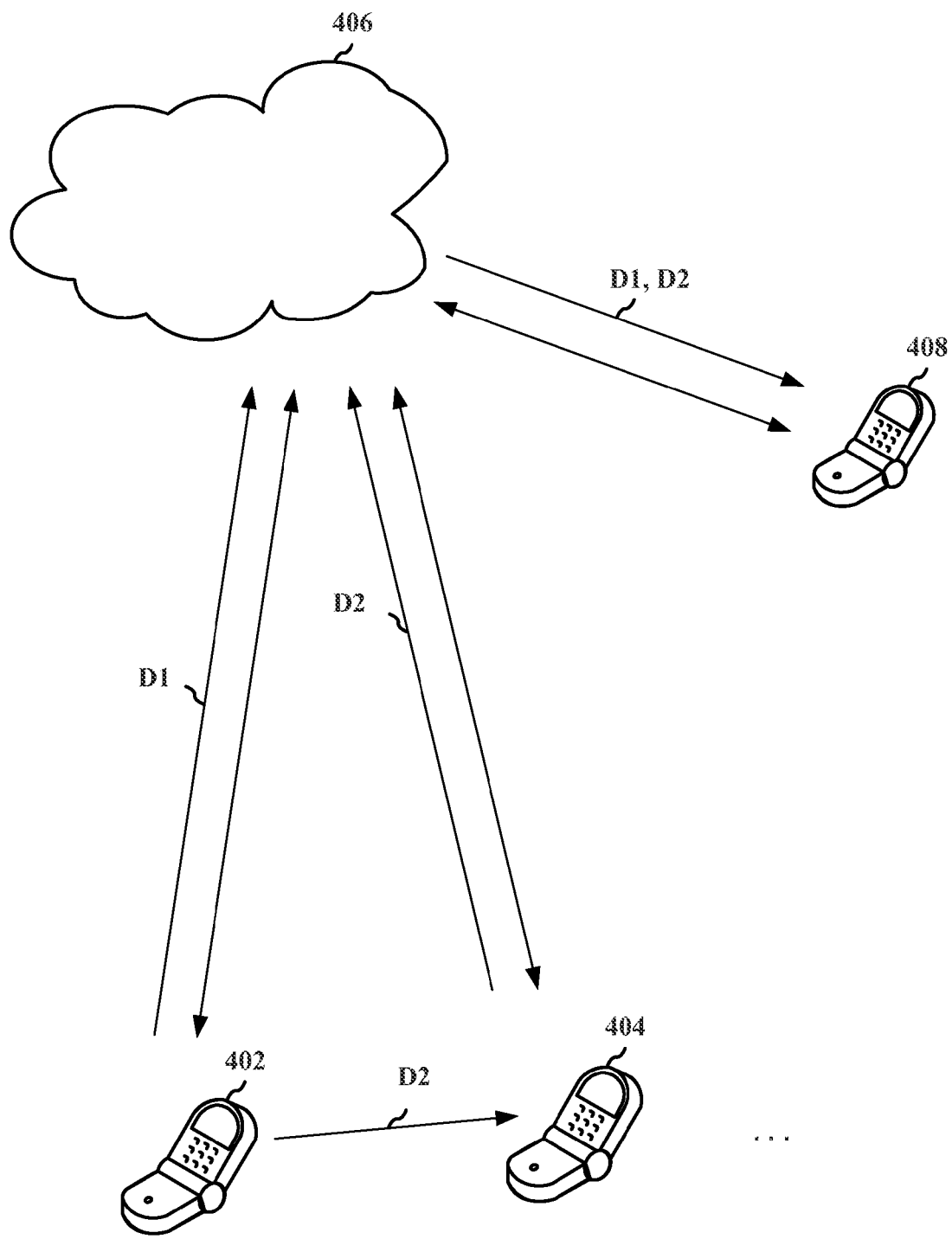
FIG. 4 is a schematic diagram illustrating a particular scheme utilizing Reverse MDC in accordance with one aspect of the disclosure.

FIG. 4 is a schematic diagram illustrating a particular scheme utilizing Reverse MDC in accordance with one aspect of the disclosure. Here, a mobile server 402 (e.g., the mobile server 200 illustrated in FIG. 2) and a cooperative helper node 404 (e.g., including the same components as the mobile server 200 illustrated in FIG. 2) may cooperate to provide multiple descriptions D1, and D2 of content to a client node 408 (e.g., the client node 300 illustrated in FIG. 3). Here, after discovering and selecting the helper node 404, and generating the multiple descriptions D1 and D2, the mobile server 402 may transmit a first description D1 over an uplink. The mobile server 402 may share the second description D2 with the helper node 404, e.g., by way of an out-of-band link, such that the helper node 404 may then transmit the second description D2 over a corresponding uplink.

The cloud 406 represents the WWAN, and may include base stations, servers, and other nodes for routing the descriptions D1 and D2 to the client node 300. For example, the cloud 406 may include the Internet. Here, the cloud 406 provides the multiple descriptions D1 and D2 to the client node, e.g., on a downlink. Thus, the client node 408 may selectively combine the multiple descriptions D1 and D2 to obtain a version of the original content from the mobile server 402.

Figure 5:
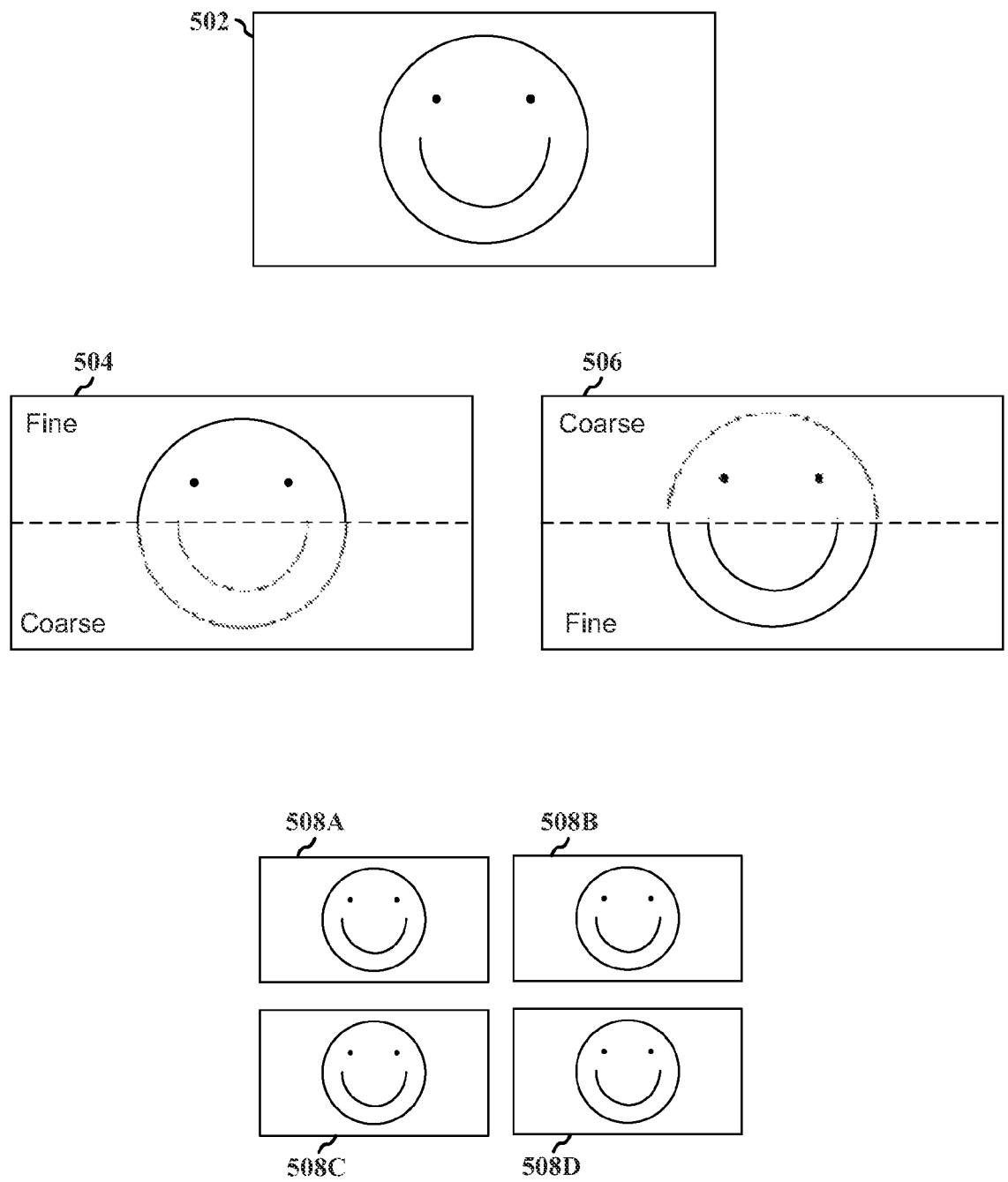
FIG. 5 is a schematic diagram illustrating some examples of MDC to further illustrate some aspects of the disclosure.

FIG. 5 illustrates some examples of MDC to further illustrate some aspects of the disclosure. Here, the content that a user may wish to stream to a client node may include an image 502. Here, the image may be a still image or a motion picture, and may include metadata, audio data, or any other associated data. In an aspect of the disclosure, the encoder 216 of a mobile server 200 may generate multiple descriptions 504 and 506 by encoding different combinations of different portions of the content at different qualities. Here, each description 504 and 506 may have a different encoding quality for a different portion of the content. However, each of the descriptions contains the whole content, with different portions having different qualities.

For example, in multiple descriptions 504 and 506, different portions of the content are different portions of an image frame. For example, in the first description 504, the upper half of the image may be encoded at a fine quality, while the lower half of the image may be encoded at a coarse quality. In the second description, the upper half of the image may be encoded at a coarse quality, while the lower half of the image may be encoded at a fine quality. In this way, reception of either one of the descriptions 504 or 506 alone would enable viewing of the entire image, albeit with half of the image being at a coarse quality. However, if both descriptions 504 and 506 are successfully received at a client node, the bottom half of the first description 504 and the top half of the second description 506 may be discarded, such that the top half of the first description 504 may be combined with the bottom half of the second description 506 to obtain a full image at fine quality.

Of course, this concept may be extended to greater than two descriptions. For example, N descriptions of content may be generated such that, in each description, a partition equal to 1/N of the content may be encoded at a first quality, while the remaining (N−1)/N of the content may be encoded at a second quality, with each of the N descriptions including a different partition being encoded at the first quality. Here, in accordance with an aspect of the disclosure, each of the partitions is mutually exclusive of each of the other partition(s), and all of the partitions considered together make up the entire content. Further, the content may be divided into equal partitions, or unequal partitions, if desired.

In an aspect of the disclosure, the number of descriptions may correspond to the number of helper nodes available to assist in the transmission of the descriptions. That is, if M helper nodes are discovered and are available to transmit a respective description, then the mobile server may generate M+1 descriptions: one for each of the helper nodes, and one to be transmitted by the mobile server. Of course, allocation of descriptions amongst helper nodes may correspond to feedback from the respective helper nodes, relating to their bandwidth, processing capabilities, etc. That is, some nodes among the mobile server and the helper nodes may provide more than one description each if its respective capabilities support it.

In a further aspect of the disclosure, downsampling of content may be utilized to generate multiple descriptions. In FIG. 5, the image 502 has been downsampled to generate four descriptions 508A, 508B, 508C, and 508D.

For example, when content is an image (e.g., a still or moving image), downsampling of the image can mean dividing the image into S sub-images. For example, referring now to FIG. 6, assume that an image 602 includes L lines, each of the lines including P pixels. Here, the image includes PL pixels. When this image is equally divided into S sub-images 608, each of the S sub-images includes PL/S pixels. In one example, each of the S sub-images may be generated by taking every $S^{th}$ pixel of each line in the original image. Of course, uniformly taking the $S^{th}$ pixel from each line is not necessary, and offsets in pixel alignment from line to line might be utilized, and the exact alignment of which pixels from the original image result in a particular sub-image can vary in a particular implementation.

Figure 6:
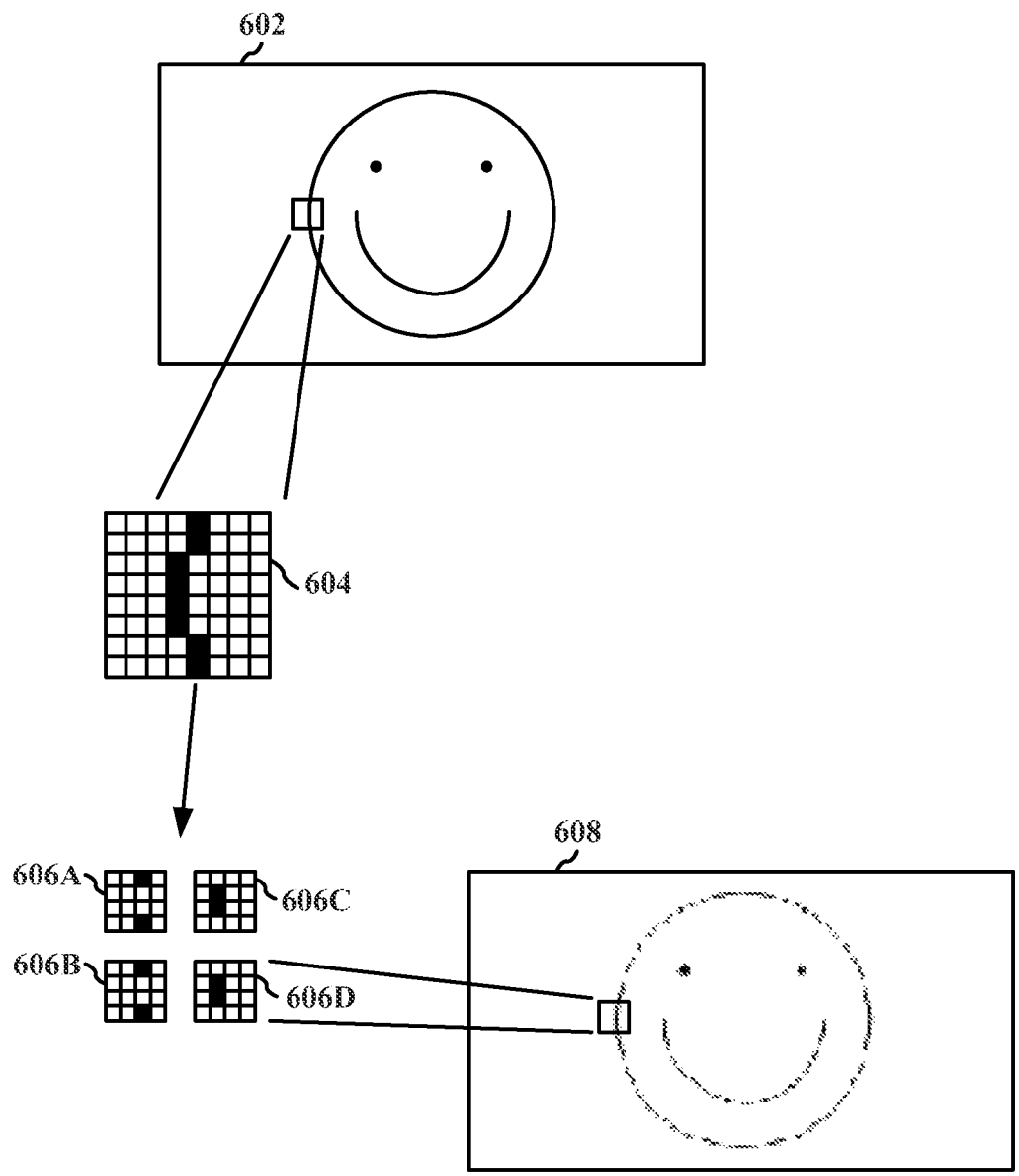
FIG. 6 is a schematic diagram illustrating additional details of one example of MDC to further illustrate some aspects of the disclosure.

In FIG. 6, the pixels 604 from the original image 602 are mapped one-to-one to four sub-images 606A, 606B, 606C, and 606D, corresponding to the respective multiple descriptions of the content. That is, each of the sub-images 606A, 606B, 606C, and 606D is a downsampled version of the entire original image 602, each including different ones of the pixels from the original image 602. In this way, the downsampled sub-images can each represent a lesser-quality version of the full image. That is, a single one of the sub-images 606D may appear as a coarse resolution version 608 of the original image 602.

Of course, the sub-images 606A, 606B, 606C, and 606D may be adapted such that the pixels can be mapped back into the original image. That is, when each of the sub-images 606A, 606B, 606C, and 606D is received, the receiver may combine the pixels together to result in the original, higher quality of image.

Further, if more than two sub-images are utilized, a client receiving less than all of the sub-images may be capable of combining the received subset of the sub-images to achieve an intermediate quality image. For example, if an image is divided into four sub-images, and only two sub-images are received, then those two sub-images may be combined to result in a combined image with half the quality or resolution of the original image, but double the quality or resolution of either one of the original images. Similarly, three of the four sub-images may be combined to achieve a three-fourths quality or resolution version of the original image.

Of course, those skilled in the art will comprehend that the term "downsampling" may have other meanings, generally referring to the conversion of content having one quality into a description of that content having a second quality, lesser than the first quality.

Figure 7:
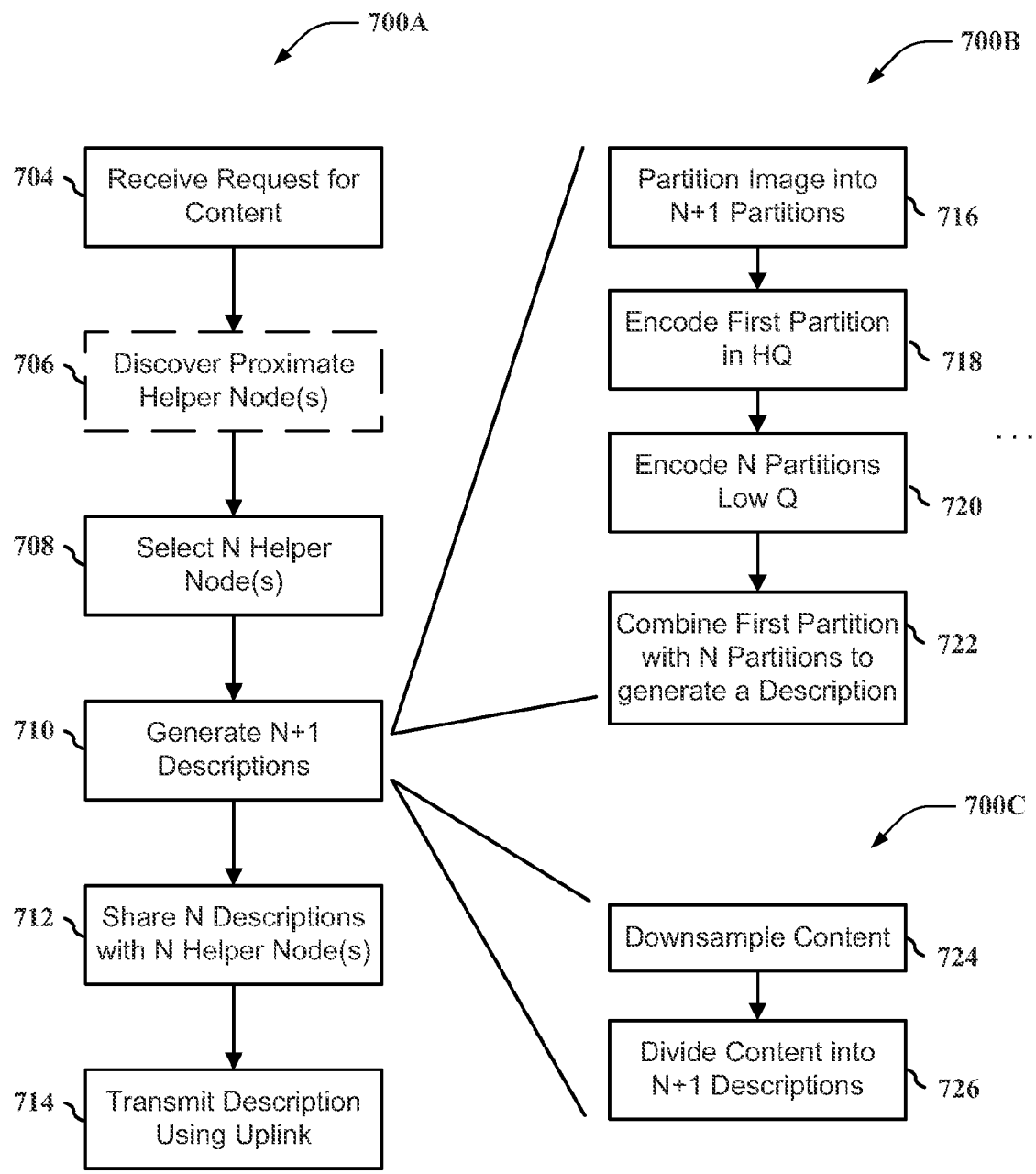
FIG. 7 is a flow chart illustrating various processes of wireless communication in accordance with some aspects of the disclosure.

FIG. 7 is a flow chart illustrating a process of wireless communication in accordance with some aspects of the disclosure. In a process 700A, in block 704, a mobile server may receive a request for content, e.g., from a client node. In block 706, the mobile server may optionally discover proximate helper node(s). Here, the mobile server may determine that the one or more helpers are in a suitable proximity for their use of the out-of-band link, e.g., by determining a relationship between an IP address of the helper node and an IP address of the mobile server; by determining a relationship between a user profile of the helper node and a user profile of the mobile server; by determining a relationship between a P2P network setup for the helper node and a P2P network setup for the mobile server; or any other suitable method for determining that the out-of-band link is suitable for the sharing of the descriptions with the selected helper nodes. In block 708, the mobile server may select a number N of helper nodes.

In block 710, the mobile server may generate N+1 descriptions related to the content to be sent to the client. Here, the multiple descriptions may be generated as described above. For example, process 700B illustrates an exemplary process for generating the N+1 descriptions. Here, in block 716, the process partitions an image into N+1 partitions. The separation of the partitions may be accomplished in various ways, such as spatially, temporally, using region of interest (ROI), using a combination of spatial, temporal, and ROI, or any other suitable partitioning of the still or motion image. In block 718, the process encodes a first partition of the image in a fine, high-quality encoding; and in block 720, the process encodes the remaining N partitions into a low, coarse quality. For example, the first partition and the remaining N partitions may be complementary, such that together they partition the whole image. Of course, the high-quality versus low, coarse quality distinction is only one example: in other examples, the encoding of the first partition may generally be any first suitable process of encoding, and the encoding of the remaining N partitions may be any suitable second process of encoding. Further, there may be more than two process of encoding, and a particular description may include partitions having any suitable number of types of encoding. In block 722, the first partition is combined with the remaining N partitions to generate the first description. The blocks 716-722 may be repeated for each of the N+1 descriptions, with a different partition being encoded into the fine, high-quality encoding in each of the descriptions, as described above.

Process 700C illustrates another exemplary process for generating the N+1 descriptions. Here, in block 724, the process downsamples the content, e.g., by distributing every 1/(N+1)$^{th}$ pixel from the original image into each of N+1 sub-images, each of the N+1 sub-images corresponding to a respective description. In block 726, the content is divided into the N+1 descriptions. It is noted that the downsampling of the content may be accomplished in various ways, such as spatially, temporally, using ROI, using a combination of spatial, temporal, and ROI, or any other suitable handling of the still or motion image.

Returning to process 700A, in block 712, the process shares N of the N+1 descriptions with the N selected helper node(s), to be transmitted on respective uplinks. In block 714, the mobile server transmits the first description utilizing its uplink.

Figure 8:
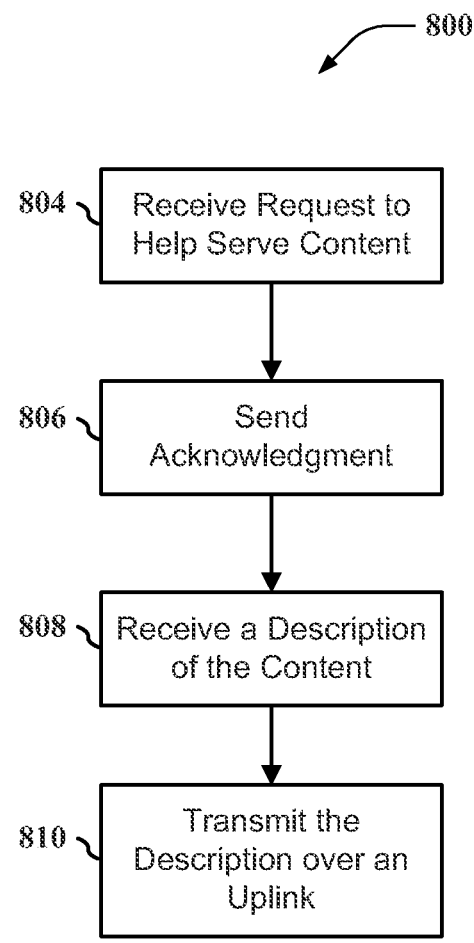
FIG. 8 is a flow chart illustrating a process for a helper node for helping send a description of the content in accordance with some aspects of the disclosure.

FIG. 8 is a flow chart illustrating a process for a helper node for helping send a description of the content. In block 804, the helper node may receive a request from the mobile server to help serve the content, and in block 806, the helper node may reply with an acknowledgment of its availability, and in some aspects of the disclosure, information about its capabilities. In block 808, the helper node may receive a respective description of the content from the mobile server; and in block 810, the helper node may transmit the description over an uplink interface to a WWAN.

Figure 9:
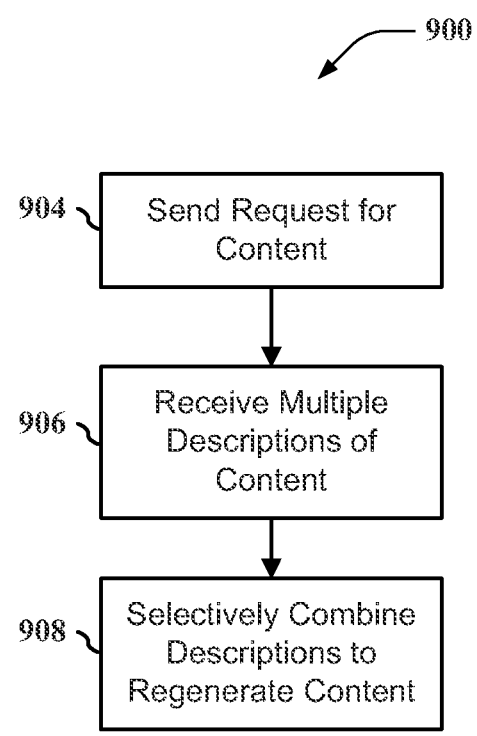
FIG. 9 is a flow chart illustrating a process for a client node for receiving multiple descriptions of content in accordance with some aspects of the disclosure.

FIG. 9 is a flow chart illustrating a process for a client node for receiving multiple descriptions of content. In block 904, the client node may send a request for content to a mobile content server. In block 906, the client node may receive multiple descriptions of the content, e.g., including a first description, a second description, etc., corresponding to the content server and the respective helper node(s). In block 908, the client node may selectively combine the descriptions to regenerate the content to have a higher quality, as a whole, than any of the individual descriptions taken alone.

Referring to FIG. 1 and FIG. 2, in one configuration, the apparatus 100 for wireless communication includes means for generating a plurality of descriptions related to the content that are different from one another but related to one another; means for transmitting a first one of the plurality of descriptions utilizing an uplink; means for sharing a second one of the plurality of descriptions with a first helper node capable of transmitting the second one of the plurality of descriptions on a second uplink; means for encoding a first portion of the image to a first quality; means for encoding a second portion of the image to a second quality; means for combining the first portion encoded to the first quality and the second portion encoded to the second quality to provide the first one of the plurality of descriptions; means for partitioning the image into the first portion, the second portion, and at least a third portion; means for encoding the third portion to the first quality; means for combining the third portion encoded to the first quality, and at least the first portion and the second portion encoded to the second quality to provide a third one of the plurality of descriptions; means for downsampling the content into a plurality of lesser quality versions of the content; means for dividing the content into n parts that are substantially distributed about the content; means for selecting at least one helper node, including the first helper node, to establish the second uplink for transmit diversity and to help in the sending of the content; means for sending a request to the at least one helper node to help in the sending of the content; means for transmitting the second one of the plurality of descriptions to the first helper node over an out-of-band link; and/or means for determining a proximity of the at least one helper node suitable for utilization of an out-of-band link. In another configuration, the apparatus 100 for wireless communication includes means for receiving a request from a content server to help the server send content to a client node; means for receiving, over a first interface, one of a plurality of descriptions of the content from the content server; and means for transmitting, over a second interface, the one of the plurality of descriptions of the content to the client node. The aforementioned means may be the processing system 114 configured to perform the functions recited by the aforementioned means. As described supra, the processing system 114 may include the processor 202, the encoder 216, the helper node manager 218, and the memory 204. As such, in one configuration, the aforementioned means may be the processor 202, the encoder 216, the helper node manager 218, the memory 204, the WWAN transceiver 206, and the WLAN/WPAN transceiver 210 configured to perform the functions recited by the aforementioned means.

In another configuration, referring to FIG. 1 and FIG. 3, the apparatus 100 for wireless communication includes means for means for receiving a first description of content from a content server; means for receiving a second description of the content from a helper node proximate to the content server; and means for selectively combining at least a portion of the first description with at least a portion of the second description to obtain the content having a higher quality, as a whole, than either the first description or the second description taken alone. The aforementioned means may be the processing system 114 configured to perform the functions recited by the aforementioned means. As described supra, the processing system 114 may include the processor 302, the decoder 310, and the memory 304. As such, in one configuration, the aforementioned means may be the processor 302, the decoder 310, the memory 304, the WWAN transceiver 306, and the WLAN/WPAN transceiver 310 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of sending content, comprising:
    generating a plurality of descriptions related to the content that are different from one another but related to one another;
    transmitting a first one of the plurality of descriptions utilizing an uplink; and
    sharing a second one of the plurality of descriptions with a first helper node capable of transmitting the second one of the plurality of descriptions on a second uplink,
    wherein the generating the plurality of descriptions comprises encoding a first portion of the content to a first quality, encoding a second portion of the content to a second quality, the second quality lesser than the first quality, and combining the first portion encoded to the first quality and the second portion encoded to the second quality to provide the first one of the plurality of descriptions, wherein each of the plurality of descriptions is configured such that reception of that description alone enables a version of the content to be decoded as a whole.

2. The method of claim 1, wherein the content comprises an image.

3. The method of claim 2, wherein the first portion comprises a first half of the image, and the second portion comprises a second half complementary to the first half of the image.

4. The method of claim 1, wherein the generating the plurality of descriptions further comprises:
    encoding the second portion of the content to the first quality;
    encoding the first portion of the content to the second quality, the second quality lesser than the first quality; and
    combining the first portion encoded to the second quality and the second portion encoded to the first quality to provide the second one of the plurality of descriptions.

5. The method of claim 4, wherein the generating the plurality of descriptions further comprises:
    partitioning the content into the first portion, the second portion, and at least a third portion;
    encoding the third portion to the first quality;
    encoding at least the first portion and the second portion of the content to the second quality, the second quality lesser than the first quality; and
    combining the third portion encoded to the first quality, and at least the first portion and the second portion encoded to the second quality to provide a third one of the plurality of descriptions.

6. The method of claim 1, further comprising:
    selecting at least one helper node, including the first helper node, to establish the second uplink for transmit diversity and to help in the sending of the content.

7. The method of claim 6, further comprising sending a request to the at least one helper node to help in the sending of the content.

8. The method of claim 6, wherein the sharing of the second one of the plurality of descriptions comprises transmitting the second one of the plurality of descriptions to the first helper node over an out-of-band link.

9. The method of claim 8, wherein the out-of-band link comprises a WLAN air interface.

10. The method of claim 9, wherein the WLAN air interface comprises an IEEE 802.11 air interface.

11. The method of claim 8, wherein the out-of-band link comprises a WPAN air interface.

12. The method of claim 6, wherein the selecting of the at least one helper node comprises:
    determining a proximity of the at least one helper node suitable for utilization of an out-of-band link.

13. The method of claim 12, wherein the determining of the proximity of the at least one helper node comprises at least one of: determining a relationship between an IP address of the helper node and a local IP address; determining a relationship between a user profile of the helper node and a local user profile; or determining a relationship between a P2P network setup for the helper node and a local P2P network setup.

14. An apparatus for wireless communication, comprising:
    a processor, and a memory coupled to the processor;
    an encoder coupled to the processor, for encoding content to generate a plurality of descriptions related to the content that are different from one another but related to one another;

a first transmitter coupled to the processor, for transmitting a first one of the plurality of descriptions utilizing an uplink; and a second transmitter coupled to the processor, for transmitting a second one of the plurality of descriptions to a first helper node capable of transmitting the second one of the plurality of descriptions on a second uplink, wherein the encoder is configured to encode a first portion of the content to a first quality, to encode a second portion of the content to a second quality, the second quality lesser than the first quality, and to combine the first portion encoded to the first quality and the second portion encoded to the second quality to provide the first one of the plurality of descriptions, wherein each of the plurality of descriptions is configured such that reception of that description alone enables a version of the content to be decoded as a whole.

15. The apparatus of claim 14, wherein the content comprises an image.

16. The apparatus of claim 15, wherein the first portion comprises a first half of the image, and the second portion comprises a second half complementary to the first half of the image.

17. The apparatus of claim 14, wherein the encoder is further configured to encode the second portion of the content to the first quality, to encode the first portion of the content to the second quality, the second quality lesser than the first quality, and to combine the first portion encoded to the second quality and the second portion encoded to the first quality to provide the second one of the plurality of descriptions.

18. The apparatus of claim 17, wherein the encoder is further configured to partition the content into the first portion, the second portion, and at least a third portion; to encode the third portion to the first quality; to encode at least the first portion and the second portion of the content to the second quality, the second quality lesser than the first quality; and to combine the third portion encoded to the first quality, and at least the first portion and the second portion encoded to the second quality to provide a third one of the plurality of descriptions.

19. The apparatus of claim 14, wherein the processor is configured to utilize the second transmitter to select at least one helper node, including the first helper node, to establish the second uplink for transmit diversity and to help in the sending of the content.

20. The apparatus of claim 19, wherein the processor is further configured to utilize the second transmitter to send a request to the at least one helper node to help in the sending of the content.

21. The apparatus of claim 19, wherein the processor is further configured to utilize the second transmitter to transmit the second one of the plurality of descriptions to the first helper node over an out-of-band link.

22. The apparatus of claim 21, wherein the out-of-band link comprises a WLAN air interface.

23. The apparatus of claim 22, wherein the WLAN air interface comprises an IEEE 802.11 air interface.

24. The apparatus of claim 21, wherein the out-of-band link comprises a WPAN air interface.

25. The apparatus of claim 19, wherein the processor is further configured to determine a proximity of the at least one helper node suitable for utilization of an out-of-band link.

26. The apparatus of claim 25, wherein the processor, in determining the proximity of the at least one helper node, is further configured to do at least one of: determine a relationship between an IP address of the helper node and a local IP address; determine a relationship between a user profile of the helper node and a local user profile; or determine a relationship between a P2P network setup for the helper node and a local P2P network setup.

27. A method of wireless communication, comprising:
receiving a request from a content server to help the server send content to a client node;
receiving, over a first interface, one of a plurality of descriptions of the content from the content server; and
transmitting, over a second interface, the one of the plurality of descriptions of the content to the client node,
wherein the one of the plurality of descriptions of content comprises a combination of a first portion of the content encoded to a second quality and a second portion of the content encoded to a first quality, the second quality lesser than the first quality, wherein each of the plurality of descriptions is configured such that reception of that description alone enables a version of the content to be decoded as a whole.

28. The method of claim 27, wherein the first interface comprises at least one of a WLAN or a WPAN air interface.

29. The method of claim 27, wherein the second interface comprises a WWAN air interface.

30. The method of claim 27, wherein the first interface comprises a WWAN air interface and the second interface comprises at least one of a WLAN or a WPAN air interface.

31. A method of wireless communication, comprising:
receiving a first description of content of a plurality of descriptions from a content server;
receiving a second description of the content of the plurality of descriptions from a helper node proximate to the content server; and
selectively combining at least a portion of the first description with at least a portion of the second description to obtain the content having a higher quality, as a whole, than either the first description or the second description taken alone,
wherein the first description comprises a combination of a first portion of the content encoded to a first quality and a second portion of the content encoded to a second quality, the second quality lesser than the first quality, and wherein each of the plurality of descriptions is configured such that reception of that description alone enables a version of the content to be decoded as a whole.

32. The method of claim 31, wherein the at least a portion of the first description comprises a first partition of the content, and the at least a portion of the second description comprises a second partition of the content.

33. A computer program product for sending content, comprising:
a non-transitory computer-readable medium comprising code for:
generating a plurality of descriptions related to the content that are different from one another but related to one another;
transmitting a first one of the plurality of descriptions utilizing an uplink; and
sharing a second one of the plurality of descriptions with a first helper node capable of transmitting the second one of the plurality of descriptions on a second uplink,
wherein the code for generating the plurality of descriptions comprises code for encoding a first portion of the content to a first quality, encoding a second portion of the content to a second quality, the second quality lesser than the first quality, and combining the first portion encoded to the first quality and the second portion encoded to the second quality to provide the first one of the plurality of descriptions, wherein each of the plurality of descriptions is configured such that reception of that description alone enables a version of the content to be decoded as a whole.

34. The computer program product of claim 33, wherein the content comprises an image.

35. The computer program product of claim 34, wherein the first portion comprises a first half of the image, and the second portion comprises a second half complementary to the first half of the image.

36. The computer program product of claim 33, wherein the code for generating the plurality of descriptions further comprises code for:
encoding the second portion of the content to the first quality;
encoding the first portion of the content to the second quality, the second quality lesser than the first quality; and
combining the first portion encoded to the second quality and the second portion encoded to the first quality to provide the second one of the plurality of descriptions.

37. The computer program product of claim 36, wherein the code for generating the plurality of descriptions further comprises code for:
partitioning the content into the first portion, the second portion, and at least a third portion;
encoding the third portion to the first quality;
encoding at least the first portion and the second portion of the content to the second quality, the second quality lesser than the first quality; and
combining the third portion encoded to the first quality, and at least the first portion and the second portion encoded to the second quality to provide a third one of the plurality of descriptions.

38. The computer program product of claim 33, further comprising code for:
selecting at least one helper node, including the first helper node, to establish the second uplink for transmit diversity and to help in the sending of the content.

39. The computer program product of claim 38, further comprising code for sending a request to the at least one helper node to help in the sending of the content.

40. The computer program product of claim 38, wherein the code for sharing the second one of the plurality of descriptions comprises code for transmitting the second one of the plurality of descriptions to the first helper node over an out-of-band link.

41. The computer program product of claim 40, wherein the out-of-band link comprises a WLAN air interface.

42. The computer program product of claim 41, wherein the WLAN air interface comprises an IEEE 802.11 air interface.

43. The computer program product of claim 40, wherein the out-of-band link comprises a WPAN air interface.

44. The computer program product of claim 38, wherein the code for selecting the at least one helper node comprises code for:
determining a proximity of the at least one helper node suitable for utilization of an out-of-band link.

45. The computer program product of claim 44, wherein the code for determining the proximity of the at least one helper node comprises code for at least one of:
determining a relationship between an IP address of the helper node and a local IP address;
determining a relationship between a user profile of the helper node and a local user profile; or
determining a relationship between a P2P network setup for the helper node and a local P2P network setup.

46. A computer program product, comprising:
a non-transitory computer-readable medium comprising code for:
receiving a request from a content server to help the server send content to a client node;
receiving, over a first interface, one of a plurality of descriptions of the content from the content server; and
transmitting, over a second interface, the one of the plurality of descriptions of the content to the client node,
wherein the one of the plurality of descriptions of content comprises a combination of a first portion of the content encoded to a second quality and a second portion of the content encoded to a first quality, the second quality lesser than the first quality, and wherein each of the plurality of descriptions is configured such that reception of that description alone enables a version of the content to be decoded as a whole.

47. A computer program product, comprising:
a non-transitory computer-readable medium comprising code for:
receiving a first description of content of a plurality of descriptions from a content server;
receiving a second description of the content of the plurality of descriptions from a helper node proximate to the content server; and
selectively combining at least a portion of the first description with at least a portion of the second description to obtain the content having a higher quality, as a whole, than either the first description or the second description taken alone,
wherein the first description comprises a combination of a first portion of the content encoded to a first quality and a second portion of the content encoded to a second quality, the second quality lesser than the first quality, and wherein each of the plurality of descriptions is configured such that reception of that description alone enables a version of the content to be decoded as a whole.

48. An apparatus for wireless communication for sending content, comprising:
means for generating a plurality of descriptions related to the content that are different from one another but related to one another;
means for transmitting a first one of the plurality of descriptions utilizing an uplink; and
means for sharing a second one of the plurality of descriptions with a first helper node capable of transmitting the second one of the plurality of descriptions on a second uplink,
wherein the means for generating the plurality of descriptions is configured to encode a first portion of the content to a first quality, to encode a second portion of the content to a second quality, the second quality lesser than the first quality, and to combine the first portion encoded to the first quality and the second portion encoded to the second quality to provide the first one of the plurality of descriptions, wherein each of the plurality of descriptions is configured such that reception of that description alone enables a version of the content to be decoded as a whole.

49. The apparatus of claim 48, wherein the content comprises an image.

50. The apparatus of claim 49, wherein the first portion comprises a first half of the image, and the second portion comprises a second half complementary to the first half of the image.

51. The apparatus of claim 48, wherein the means for generating the plurality of descriptions is configured to:
encode the second portion of the content to the first quality;
encode the first portion of the content to the second quality, the second quality lesser than the first quality; and
combine the first portion encoded to the second quality and the second portion encoded to the first quality to provide the second one of the plurality of descriptions.

52. The apparatus of claim 51, wherein the means for generating the plurality of descriptions is configured to:
partition the content into the first portion, the second portion, and at least a third portion;
encode the third portion to the first quality;
encode at least the first portion and the second portion of the content to the second quality, the second quality lesser than the first quality; and
combine the third portion encoded to the first quality, and at least the first portion and the second portion encoded to the second quality to provide a third one of the plurality of descriptions.

53. The apparatus of claim 48, further comprising:
means for selecting at least one helper node, including the first helper node, to establish the second uplink for transmit diversity and to help in the sending of the content.

54. The apparatus of claim 53, further comprising means for sending a request to the at least one helper node to help in the sending of the content.

55. The apparatus of claim 53, wherein the means for sharing the second one of the plurality of descriptions is configured to transmit the second one of the plurality of descriptions to the first helper node over an out-of-band link.

56. The apparatus of claim 55, wherein the out-of-band link comprises a WLAN air interface.

57. The apparatus of claim 56, wherein the WLAN air interface comprises an IEEE 802.11 air interface.

58. The apparatus of claim 55, wherein the out-of-band link comprises a WPAN air interface.

59. The apparatus of claim 53, wherein the means for selecting the at least one helper node is configured to determine a proximity of the at least one helper node suitable for utilization of an out-of-band link.

60. The apparatus of claim 59, wherein the means for determining the proximity of the at least one helper node is configured to perform at least one of:
determining a relationship between an IP address of the helper node and a local IP address;
determining a relationship between a user profile of the helper node and a local user profile; or
determining a relationship between a P2P network setup for the helper node and a local P2P network setup.

61. An apparatus for wireless communication, comprising:
means for receiving a request from a content server to help the server send content to a client node;
means for receiving, over a first interface, one of a plurality of descriptions of the content from the content server; and
means for transmitting, over a second interface, the one of the plurality of descriptions of the content to the client node,
wherein the one of the plurality of descriptions of content comprises a combination of a first portion of the content encoded to a second quality and a second portion of the content encoded to a first quality, the second quality lesser than the first quality, and wherein each of the plurality of descriptions is configured such that reception of that description alone enables a version of the content to be decoded as a whole.

62. An apparatus for wireless communication, comprising:
means for receiving a first description of content of a plurality of descriptions from a content server;
means for receiving a second description of the content of the plurality of descriptions from a helper node proximate to the content server; and
means for selectively combining at least a portion of the first description with at least a portion of the second description to obtain the content having a higher quality, as a whole, than either the first description or the second description taken alone,
wherein the first description comprises a combination of a first portion of the content encoded to a first quality and a second portion of the content encoded to a second quality, the second quality lesser than the first quality, and wherein each of the plurality of descriptions is configured such that reception of that description alone enables a version of the content to be decoded as a whole.

63. An apparatus for wireless communication, comprising:
a processor; and
a memory coupled to the processor,
wherein the processor is configured to:
receive a request from a content server to help the server send content to a client node;
receive, over a first interface, one of a plurality of descriptions of the content from the content server; and
transmit over a second interface, the one of the plurality of descriptions of the content to the client node,
wherein the one of the plurality of descriptions of content comprises a combination of a first portion of the content encoded to a second quality and a second portion of the content encoded to a first quality, the second quality lesser than the first quality, and wherein each of the plurality of descriptions is configured such that reception of that description alone enables a version of the content to be decoded as a whole.

64. An apparatus for wireless communication, comprising:
a processor; and
a memory coupled to the processor,
wherein the processor is configured to:
receive a first description of content of a plurality of descriptions from a content server;
receive a second description of the content of the plurality of descriptions from a helper node proximate to the content server; and
selectively combine at least a portion of the first description with at least a portion of the second description to obtain the content having a higher quality, as a whole, than either the first description or the second description taken alone,
wherein the first description comprises a combination of a first portion of the content encoded to a first quality and a second portion of the content encoded to a second quality, the second quality lesser than the first quality, and wherein each of the plurality of descriptions is configured such that reception of that description alone enables a version of the content to be decoded as a whole.

* * * * *